United States Patent
Dullien et al.

(10) Patent No.: US 7,141,530 B2
(45) Date of Patent: Nov. 28, 2006

(54) CATALYST SUPPORT WITH INTERSECTING CHANNEL NETWORK, CATALYSIS REACTOR COMPRISING SAME AND METHOD FOR MAKING SAME

(75) Inventors: Francis A. L. Dullien, RR # 1, Drumbo, Ontario (CA) N0J 1G0; Daniel Durand, Rueil Malmaison (FR); Céline Diab, Rueil Malmaison (FR); Aurélie Diab, Louveciennes (FR); Barbara Evrard, Louveciennes (FR)

(73) Assignees: Institut Francais du Petrole, Rueil Malmaison Cedex (FR); Francis A. L. Dullien, Ontario (CA)

( * ) Notice: Subject to any disclaimer, the term of this patent is extended or adjusted under 35 U.S.C. 154(b) by 179 days.

(21) Appl. No.: 10/474,054

(22) PCT Filed: Apr. 5, 2002

(86) PCT No.: PCT/FR02/01191

§ 371 (c)(1),
(2), (4) Date: Oct. 6, 2003

(87) PCT Pub. No.: WO02/081083

PCT Pub. Date: Oct. 17, 2002

(65) Prior Publication Data
US 2004/0116288 A1 Jun. 17, 2004

(30) Foreign Application Priority Data
Apr. 5, 2001 (FR) ................................. 01 04760

(51) Int. Cl.
*B01J 21/04* (2006.01)
(52) U.S. Cl. .............................. 502/527.11; 502/527.12

(58) Field of Classification Search ................ 502/439, 502/527.18, 527.19, 527.2, 527.24, 527.11, 502/527.12
See application file for complete search history.

(56) References Cited

U.S. PATENT DOCUMENTS

| | | | | | |
|---|---|---|---|---|---|
| 4,235,583 | A | * | 11/1980 | Reed | 425/464 |
| 4,533,584 | A | * | 8/1985 | Takeuchi et al. | 428/116 |
| RE33,013 | E | * | 8/1989 | Takeuchi et al. | 428/116 |
| 5,505,911 | A | * | 4/1996 | Hafele | 422/174 |
| 5,693,295 | A | * | 12/1997 | Foster | 422/180 |
| 6,227,699 | B1 | * | 5/2001 | Wight, Jr. | 366/336 |
| 6,372,289 | B1 | * | 4/2002 | Hickman | 427/228 |
| 6,375,905 | B1 | * | 4/2002 | Moini et al. | 422/180 |
| 6,534,022 | B1 | * | 3/2003 | Carlborg et al. | 422/180 |
| 6,663,839 | B1 | * | 12/2003 | Platvoet et al. | 422/177 |

FOREIGN PATENT DOCUMENTS

| | | |
|---|---|---|
| DE | 198 35 246 A1 | 2/2000 |
| EP | 0 315 047 | 5/1989 |
| WO | 97/27385 | 7/1997 |

OTHER PUBLICATIONS

Patent Abstracts of Japan 08019742 Jan. 23, 1996.

* cited by examiner

*Primary Examiner*—Cam N. Nguyen
(74) *Attorney, Agent, or Firm*—Antonelli, Terry, Stout and Kraus, LLP

(57) ABSTRACT

The present invention relates to a catalyst support comprising a monolithic body (1) with a first network of channels (2). According to the invention, the support comprises at least an additional network of channels (3) in an arrangement whereby channels (2, 3) of the networks intersect one another.

16 Claims, 1 Drawing Sheet

CATALYST SUPPORT WITH INTERSECTING CHANNEL NETWORK, CATALYSIS REACTOR COMPRISING SAME AND METHOD FOR MAKING SAME

FIELD OF THE INVENTION

The present invention relates to a monolith type catalyst support with intersecting channel networks, to a catalyst comprising such a support and to a method allowing such a catalyst support to be obtained.

More particularly, it relates to supports used in catalytic reactions and providing, by their structural characteristics, particular flow regimes for the hydrodynamics of the fluids flow which are beneficial to the catalytic activity of the conversion of the gaseous and/or liquid reactants flowing therethrough.

BACKGROUND OF THE INVENTION

As it is well-known in catalytic scrubbing of exhaust gases such as those discharged by thermal power plants or internal-combustion engines, notably of motor vehicles, the catalytic phases used are generally deposited on monolithic supports made of ceramic or metallic materials.

These supports are generally made by ceramic extrusion or by winding of corrugated metal strips or by superposition of sheet metal so as to obtain a monolithic body with a single network of one-dimensional and one-directional channels.

The fluid to be treated thus flows through the channels present in this support and the constituents of this fluid react on contact with the catalytic phases present in these channels.

Although such supports have many advantages, they can still be improved.

In fact, the reaction performances of catalysts prepared on such supports are not always sufficient because the time of contact of the reactants with the catalytic phase is not sufficient to obtain, at the end of the treating stage, a <<clean>> fluid.

SUMMARY OF THE INVENTION

The present invention aims to overcome the aforementioned drawbacks by providing a catalyst support allowing, because of these particular effects on the fluid flow hydrodynamics, to confer on the catalytic reaction in which it takes part additional activity for conversion of the reactants.

Thus, according to the invention, a catalyst support comprising a monolithic body with a first network of channels is characterized in that it comprises at least an additional network of channels in an arrangement whereby the channels of the networks intersect one another.

According to another feature, the section of the channels of the first network is different from the section of the channels of the additional network.

Advantageously, the density of the channels of the first network is different from the density of the channels of the additional network.

Preferably, the directional axes of at least two networks of intersecting channels form an angle ranging between 10 and 170°.

Advantageously, the ratio of the open sections of the channels belonging respectively to at least two intersecting networks ranges between 1 and 10000.

Furthermore, the ratio of the number of small-section channels belonging to a first network to the number of channels of larger section belonging to at least a second intersecting network ranges between 0.001 and 1000.

According to another feature, the channels of at least one network have a continuous and rectilinear structure.

Besides, the catalyst support comprises a monolithic structure consisting of a ceramic material.

In a variant, this catalyst support comprises a monolithic structure consisting of a metallic material.

In other variants, the catalyst support comprises a monolithic structure consisting of a composite and/or synthetic material.

This monolithic structure has a honeycomb, foam or fiber type structure.

In a first embodiment, such a catalyst support is used for a catalyst intended for exhaust gas scrubbing or for a catalyst intended for catalytic reactions between two fluids.

According to the present invention, a method for making a catalyst support comprising a monolithic body is characterized in that:

a monolithic body is made with a first network of channels, the constituent material of the monolithic body is impregnated with at least one catalyst, at least an additional network of channels is formed in the same body in an arrangement whereby the channels of the networks intersect one another.

In a variant, the first network and at least an additional channel network are formed simultaneously.

In another variant, the constituent material of the monolithic body is impregnated with the catalyst prior to forming said body.

BRIEF DESCRIPTION OF THE FIGURES

Other features and advantages of the present invention will be clear from reading the description hereafter, given by way of non limitative example, with reference to the accompanying drawings wherein.

DETAILED DESCRIPTION

Figure 1:
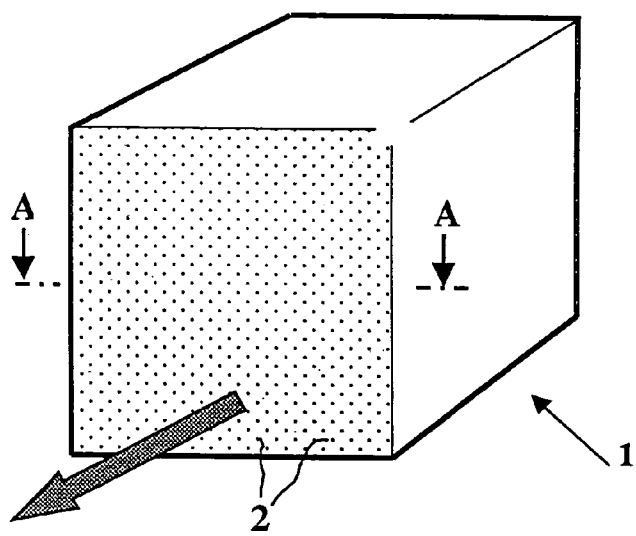
FIG. 1 is a perspective view of a catalyst support according to the prior art.
Figure 2:
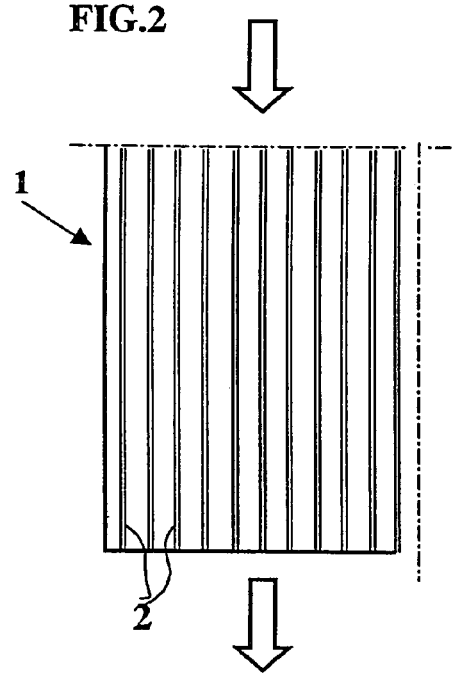
FIG. 2 is a diagrammatic view in partial cross-section along plane AA of FIG. 1.

With reference to FIGS. 1 and 2, the catalyst support of the prior art comprises a monolithic body 1 having here, by way of example, a parallelepipedic shape and comprising a network of evenly and homogeneously distributed one-directional channels 2.

These channels have the same open cross-section S1 and run right through monolithic body 1 in a substantially rectilinear manner, starting from a face of the monolithic body and arriving at the opposite face of this body.

This monolith can be made from various materials such as ceramic, metallic, composite or synthetic materials, in form of a honeycomb, foam, woven fiber or interlocked fiber (felt) structure.

The most commonly used monoliths, which are also the least costly to produce, are those made of ceramic whose essential components can be alumina, aluminosilicates, possibly doped with zirconia (cordierite, mullite, mullite-zirconia, . . . ). Silicon carbides and nitrides are more delicate to use and more expensive materials.

Ceramic monoliths can have a honeycomb structure, i.e. they comprise a homogeneous network of one-directional rectilinear channels. These monoliths, made by means of an extrusion technique, and generally used as catalyst supports for motor vehicle exhaust gas depollution, can be crossed by approximately ten to one hundred channels per square centimeter (100 to 600 cpsi) of more or less large section (of the order of 0.5 to 1.5 mm in side if the channels are of square shape).

For applications such as thermal power plant discharge depollution, the same monolith structure is used with generally different materials, larger channel sections (of the order of one cm$^2$) and a lower channel density.

Foams made from this type of ceramic material, or with silicon nitrides or carbides, can also be used, as well as foams made from synthetic or composite materials.

Similarly, fibrous structures of these materials, in form of interlocked fibers (of felt type) or woven fibers, can also be selected to obtain monolithic supports after forming.

In this case, the first channel network consists of the pores of the foam or of the cells of the fibrous structure, and the channels are no longer one-directional or continuous, and their size is generally smaller.

Metallic supports can also be selected and industrial monoliths provided with a channel network are used, in particular for applications as catalyst supports for motor vehicle exhaust gas scrubbing.

The materials which are commonly used are special steels of <<Fecralloy>> type, or aluminated or aluminized steels. These steels contain, either in their composition or at the surface of the material, aluminum which, after special treatment, shows at the surface an alumina microlayer which protects the support, under severe conditions of use (temperature, oxidizing and corrosive environment), against too fast a mechanical, structural or physico-chemical deterioration.

These materials used in form of sheet metal (several ten-micron thick sheets) or of fibers can lead to the making of monoliths having, from the stage of their design, a network of channels. The sheets, that have first been corrugated, can be wound to form honeycomb-structure monoliths. These corrugated sheets, after cutting, can also be piled to form monoliths where the channels of a single network communicate with one another. Several cm long and several ten mm wide fibers can also be produced from these materials. Monoliths can be produced by compression and welding of these fibers.

In general, it is desirable to deposit on the support of very small specific surface area (quite close to the geometric surface area) a coat of large specific surface area (approximately 50 to 200 m$^2$/g), generally referred to as wash-coat. This deposition is carried out in one or more stages so that the support is uniformly covered with this coat. One technique consists in dipping the support into a suspension of the product to be used, then in eliminating by blowing the excess material clogging the channels, and in fixing this coat on the material of the support by means of one or more drying-calcination operations.

The active elements of the catalyst are generally transition metals (Cu, Co, Ni, Fe, Mo, Mn, . . . ) or precious or noble metals (Pt, Pd, Rh, Ru, Ir, Au, Ag, . . . ). They are generally introduced in form of a solution of their soluble salts (nitrates, chlorides, acetates, . . . ). This operation can be carried out after the coating stage by means of techniques known to the man skilled in the art, such as dry or excess impregnation, by spraying solution onto and into the coated monolith, or ion exchange. These active elements can also be deposited on the materials forming the wash-coat prior to the coating stage.

From this support of the prior art, the applicant has carried out a series of tests according to the stages below.

A 10×10×10 cm monolithic ceramic body comprises a network of channels 2 whose density is 66 channels per cm$^2$ (or 400 cpsi) and the open section S1 of each one is about 1 mm$^2$;

This support is entirely coated, including channels 2, with an alumina wash-coat in a proportion of 100 g per liter of substrate;

It is then impregnated with a catalyst based on platinum salt solution so that the platinum content is 0.5% by weight in relation to the assembly consisting of the monolith and the coat;

This catalyst support is fed into a catalytic reactor while checking that the system is perfectly sealed;

The temperature rise of the reactor is programmed by means of a regulator at a rate of 5° C./min;

A gas circulates in the reactor, as shown by the arrows in the figures, with air containing 2 g/Nm$^3$ xylenes with a flow rate of 20 m$^3$/h.

An analyzer equipped with a flame ionization detector is placed at the reactor outlet and allows continuous monitoring of the hydrocarbon concentration evolution (analysis of the total carbon in methane equivalent) after catalytic reaction and thus determination of the xylenes conversion rate.

The results of these tests are as follows:

As the temperature rises in the reactor, it can be observed that the temperature at which 50% of the xylenes are oxidized (light-off temperature TLO) is 240° C. at the reactor outlet and that the maximum xylene conversion is 94% for a temperature of 285° C.

Figure 3:
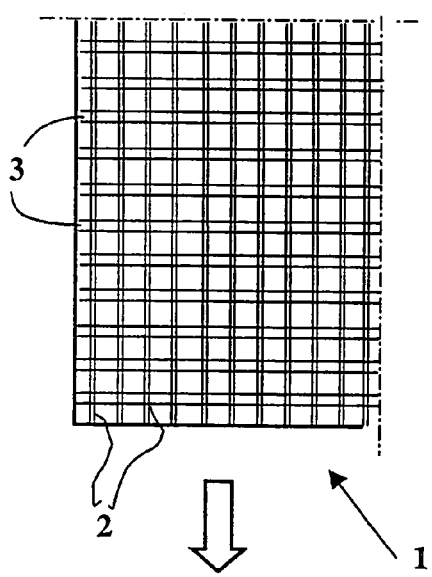
FIG. 3 is a diagrammatic view, in partial cross-section, of a catalyst support according to the invention.

FIG. 3 shows a catalyst support according to the invention.

This support comprises a monolithic body 1 with a network of channels 2, referred to in the description hereafter as first channel network, having the same characteristics as those described in connection with FIGS. 1 and 2.

According to the invention, body 1 comprises at least an additional network of channels 3 whose channels intersect the channels of the first network and preferably at least two by two.

Advantageously, channels 3 have an open cross-section S2 and a density that are different from those of the channels of the first network.

Preferably, the ratio of the number of channels of small section belonging to a network to the number of channels of larger section belonging to at least an intersecting network ranges between 0.001 and 1000.

Unlike the first network of channels 2, the channels 3 of at least an additional network can have a non-homogeneous distribution and a non-rectilinear direction.

In order to obtain a high-efficiency catalyst support, the ratio of the open sections of the channels of larger section to those of the channels of smaller section ranges between 1 and 10000, preferably between 1 and 5000 and most preferably between 1 and 1000, and the ratio of the number of channels 2 belonging to the first network to the number of channels 3 belonging to an additional network intersecting the first network ranges between 1 and 1000, preferably between 1 and 500 and most preferably between 1 and 100.

Each of these channel networks has a different spatial orientation and the directional axes of each of these networks which intersect one another at least two by two are so oriented that the angles formed between each one range between 10 and 170°, preferably between 30 and 150° and most preferably between 60 and 120°.

It is therefore very easy to create an additional channel network from the aforementioned products of the prior art (ceramic or metallic monolithic supports with a honeycomb or foam or fiber structure).

In general, this additional network has a lower channel density and larger open sections.

However, although the initial monolith has a first network of large channels, the additional network can have channels with a smaller open section.

Preferably, the number of channels of smaller section is greater than the number of channels of larger section.

Preferably, the channels belonging to the first network of intersecting channels are evenly and homogeneously distributed on a face of the monolithic support, with the same open section, and they run right through the monolith in a preferably rectilinear manner.

On the other hand, for the additional network(s) that may have been created upon making the support, the geometrical distributions of the opening of the channels belonging thereto, the homogeneity of their distribution on a section of the support and their rectilinear profile can be imperfect.

This additional network can be readily made either before or after depositing the catalytic phase, by means of common drilling techniques (mechanical, electromechanical, laser), but other techniques can also be developed for creating, when forming the monolith, two or more channel networks meeting the specifications of the invention.

According to another mode of obtaining a catalyst support consisting of fibers, the fibers can be coated with the catalytic phase, then the monolithic body is formed with its channel networks.

From this type of new catalyst support, the applicant has carried out a series of comparative tests in relation to the support of the prior art mentioned above.

According to a first comparative test, a monolith of the prior art such as the monolith described in connection with FIGS. 1 and 2 is modified by creating an additional network of channels 3 arranged substantially perpendicular to the first network of channels 2 and consisting of 85 4-mm diameter channels with a density of 0.85 channels per $cm^2$ (6 cpsi) and an open section S2 of about 12 $mm^2$, evenly distributed over the total section of the monolith.

The amounts of wash-coat and of platinum deposited on this support are the same as those used for the previous catalyst.

As in the test carried out on the support according to the prior art, the catalyst support is fed into the reactor with the same direction of flow of the gases through the monolith, i.e. through the first network of channels 2. The same operating conditions are applied for the experiments.

Under these conditions, a notable improvement in the catalyst efficiency is observed with:
  lowering of the half conversion temperature: TLO=220° C. instead of 240° C.,
  conversion of 94% of the xylenes at 265° C. instead of 285° C.,
  total conversion of the xylenes at 335° C.

It can be noted that, unlike the results of the test carried out on the support of the prior art, total oxidation of the xylenes has been obtained.

Figure 4:
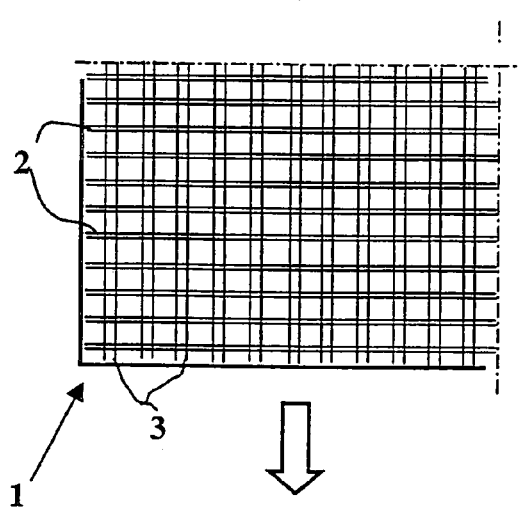
FIG. 4 is a diagrammatic view, in partial cross-section, of another arrangement of the catalyst support according to the present invention.

According to another comparative test, the above catalyst support is again fed into the reactor, as shown in FIG. 4, in such a way that the gases circulate through the additional network of channels 3 which is less dense but where the open section of each channel is approximately twelve times larger.

The operating conditions are the same as those mentioned above, i.e. a flow rate of 20 $m^3/h$.

It has been observed that the catalyst efficiency is even higher with:
  a half conversion temperature (TLO) of 210° C. instead of 240° C.,
  a 94% conversion rate for a temperature of 225° C. instead of 285° C.,
  a total xylenes conversion for a temperature of 260° C.

The efficiency difference between the catalyst of FIG. 2 and the catalyst of FIG. 3 can be explained by the fact that, in the case of FIG. 3, the gases circulate in a first network of 1-$mm^2$ section channels 2 which are interrupted at regular intervals by 12-$mm^2$ section channels 3 in which additional mixing of the gases with the residual xylene occurs, which has the advantage of increasing the conversion rate.

Similarly, the efficiency difference between the catalyst of FIG. 2 and the catalyst of FIG. 4 can be analysed by the change in the hydrodynamic flows between channels 2 and 3. For example, if the circulation of the gases is in the turbulent state in the channels 3 of FIG. 4, the circulation in channels 2 of the catalyst of FIG. 2 can be in the laminar state.

In the catalyst of FIG. 4, channels 3 having an open section of 12 $mm^2$ are provided on their periphery with cavities resulting from the first intersecting channel network 2, which leads to a surface roughness of the walls of channels 3 which can, under certain conditions, generate a circulation of the gases in channels 3 in the turbulent state with a Reynolds number below 2100, considering said conditions.

Thus, according to the summary table below:

| Operating conditions | Air + 2 $g/m^3$ (xylenes) Gas flow rate: 20 $m^3/h$ - 5° C./min | | |
|---|---|---|---|
| | Test 1 | Test 2 | Test 3 |
| Support | Standard with 66 1-$mm^2$ section channels/$cm^2$ | Standard + $2^{nd}$ network of 0.85 12-$mm^2$ section channels/$cm^2$ | Standard + $2^{nd}$ network of 0.85 12-$mm^2$ section channels/$cm^2$ |
| Gas flow direction | First network | Additional network | Additional network |
| Results: Temperatures for reaching 50, 94 and 100% conversion | | | |
| 50% conversion | 240° C. | 220° C. | 210° C. |
| 94% conversion | 285° C. | 265° C. | 225° C. |
| 100% conversion | — | 335° C. | 260° C. | it can be underlined that the creation of an additional channel network on the catalyst support has a threefold beneficial effect:
  notable lowering of the oxidation reaction light-off temperature,
  lowering of the maximum product conversion temperature, and
  conversion rate increase.

Another comparative study was carried out by the applicant on the basis of exhaust gas catalysts for Diesel engines.

The applicant therefore used two commercial Diesel oxidation catalysts prepared on honeycomb-structure ceramic supports impregnated with catalysts, with a density of 48 channels per cm² (300 cpsi) and an open section of approximately 1 mm², cut out in form of 10×10×10 cm cubic supports (total volume 2 l).

These two cubes are mounted end to end in an exhaust line of a Diesel engine of 1900 cm³ in cylinder capacity, installed on an engine test bench with the channel networks of each cube arranged as the continuation of one another.

CO (IR) and HC (FID) analyzers for continuous measurement of the evolutions of the gaseous pollutant contents are installed at the outlet of the catalytic system.

These two catalysts are tested under stabilized engine conditions, i.e. an engine speed of 1750 rpm, a hydraulic brake load corresponding to 30% of the maximum power, which leads to a gas temperature at the catalyst inlet of 240° C.

By comparison with measurements performed without a catalytic system, the conversion rates for the main pollutants are as follows under these operating conditions:
CO=91%
HC=82%.

A first comparative test was carried out with two catalysts cut out according to the above procedure, but also pierced, substantially perpendicular to the first channel network, with an additional network of channels having an open section of 7 mm² and a density of approximately 1.4 channels per cm² (10 cpsi). They are then mounted in series in the exhaust line while keeping the passage of the gases through the channels of the first network.

Under these conditions, the performances are as follows:
CO=93%
HC=85%.

In another test, the conditions and configurations of the above test are repeated but filling of the catalytic system is changed, i.e. the gas passes through the channels of the additional network which, in the present case, have a larger section, and no longer through the first network of the industrial support.

Keeping the same engine speed of 1750 rpm and a torque of 60 Nm with a higher pressure drop in the exhaust line induced by the decrease in the open porosity of the additional network of channels through which the gases circulate leads to an outlet temperature of the exhaust gases that is substantially higher than the temperature in the previous test, i.e. 250° C.

Under these conditions, the conversion rates are as follows:
CO=98%
HC=90%.

The previous test was repeated but the engine load was adjusted so that the temperature was stabilized at 240° C., and the following conversion rates were obtained:
CO=97%
HC=88%.

In these tests, the catalytic performances as regards oxidation of the gaseous pollutants (CO and HC) are also improved by the creation of an additional channel network.

Another series of tests was carried out with a particular type of Diesel engine depollution catalyst commonly referred to as DeNOx.

This catalyst has the specific feature of trapping nitrogen oxides (NOx) when the engine runs under lean-burn conditions and the nitrogen oxides thus adsorbed are then reduced to molecular nitrogen upon intermittent fuel injections.

Preferably, the catalytic phase used consists of precious metals and it is deposited on a barium-doped alumina (approximately 15% by weight) serving both as a support for the precious metals and as an adsorbent mass for the nitrogen oxides.

The first test is carried out using two ceramic monoliths with a honeycomb structure having the same dimensions as those described above in connection with the commercial Diesel oxidation catalysts and on which the adsorbent catalytic phase is deposited in the proportion of 150 g wash-coat per liter of ceramic support.

The assembly consisting of the two monoliths arranged in series is installed on an exhaust line of a Diesel engine for which the running conditions are adjusted in such a way that the temperature of the exhaust gases passing into the catalytic system is 300° C. and their space velocity (GHSV) is 50 000 h$^{-1}$.

Under these testing conditions, it has been observed that the amount of nitrogen oxides trapped on the adsorbent mass corresponds to 9% of the mass theoretically adsorbable on the support before nitrogen oxides emissions appear at the outlet of the adsorbent catalytic mass.

The same test is repeated using monolithic bodies according to the invention, i.e. with an additional channel network.

This additional channel network is substantially perpendicular to the first network and comprises about 1.5 channels per cm² with a 7-mm² open section.

The result obtained is that the amount of nitrogen oxides trapped on the adsorbent mass corresponds to 15% of the mass theoretically adsorbable on the support before nitrogen oxides emissions appear at the outlet of the catalytic mass.

The amount of nitrogen oxides trapped is thus increased by more than 60% by means of the invention.

A last series of tests is carried out with a three-way type catalyst mounted on the exhaust line of a vehicle equipped with a gasoline engine whose fuel/air ratio is adjusted to the stoichiometric value (1).

This vehicle is mounted on a chassis dynamometer and the standard European pollution test (called NMVEG) is applied thereto, this test corresponding to urban driving conditions.

During this test, the parameter selected was the time required for lighting of the catalyst, i.e. the time between engine start-up (with a catalyst temperature for which the pollutant conversion rate is zero) and catalytic activity start (with a light-off temperature TLO for which more than 50% of the pollutants are converted).

As in the previous examples, the same amount of catalytic phase is deposited, either on ceramic supports of the prior art, with a first network of channels of 66 channels per cm², or on supports according to the invention comprising an additional network of channels arranged substantially perpendicular to the first network and comprising approximately 1.4 channels per cm² with a 7-mm² open section.

The two supports were tested under the same conditions and it has been observed that the time required for reaching the light-off temperature was 165 seconds for the support according to the prior art and 115 seconds for the support according to the invention.

Thus, the presence on a monolith type support of at least two channel networks having the following characteristics:
different channel size in each network,
intersecting channel networks leads to improving the reaction performances of a system (catalytic performances in the above examples), by changing the hydrodynamics of the fluid flows through the support of the invention.

The present invention is not limited to the examples described in connection with catalytic reactions for a fluid resulting from a combustion in an internal-combustion engine, such as exhaust gases, but it includes any variant.

It can notably be applied to catalysts for catalytic reactions allowing catalysis of a fluid in a gaseous or liquid phase as generally used in the field of petroleum processing.

The invention claimed is:

1. A catalyst support for treatment of a fluid comprising a monolithic body having a first network of channels and at least one additional network of channels in an arrangement wherein at least the channels of the additional network extend in a substantially rectilinear manner, wherein the fluid to be treated circulates in the first network of channels, and wherein channels of the networks intersect one another at an angle ranging between 10 and 170°.

2. A catalyst support as claimed in claim 1, wherein the section of channels of the first network is different from the section of channels of the additional network.

3. A catalyst support as claimed in claim 1, wherein the density of channels of the first network is different from the density of channels of the additional network.

4. A catalyst support as claimed in claim 3, wherein the density of channels of the additional network is lower than the density of channels of the first network, and the section of channels of the additional network is larger than the section channels of the first network.

5. A catalyst support as claimed in claim 4, wherein the channels of the first network extend between a first pair of parallel faces of the monolithic body.

6. A catalyst support as claimed in claim 5, wherein the channels of the additional network extend between a second pair of parallel faces of the monolithic body, the first pair of faces being perpendicular to the second pair.

7. A catalyst support as claimed in claim 1, wherein the ratio of the open sections of the channels belonging respectively to at least two intersecting networks ranges between 1 and 10000.

8. A catalyst support as claimed in claim 1, wherein the ratio of the number of small-section channels belonging to a first network to the number of channels of larger section belonging to at least a second intersecting network ranges between 0.001 and 1000.

9. A catalyst support as claimed in claim 1, wherein channels of the first network have a continuous and rectilinear structure.

10. A catalyst support as claimed in claim 1, which comprises a monolithic structure consisting of a ceramic material.

11. A catalyst support as claimed in claim 10, which comprises a monolithic structure having honeycomb type structures.

12. A catalyst support as claimed in claim 10, which it comprises a monolithic structure in form of a foam.

13. A catalyst support as claimed in claim 8, which it comprises a monolithic structure in form of fibers.

14. A catalyst support as claimed in claim 1, which comprises a monolithic structure consisting of a metallic material.

15. A catalyst support as claimed in claim 1, which comprises a monolithic structure consisting of a composite material.

16. A catalyst support as claimed in claim 1, which comprises a monolithic structure consisting of a synthetic material.

* * * * *